United States Patent
Major et al.

[11] Patent Number: 5,114,732
[45] Date of Patent: May 19, 1992

[54] METHOD OF MIXING VISCOUS EMULSIONS

[75] Inventors: Michael D. Major, Evanston, Ill.; Marion A. Dupre, East Haven, Conn.

[73] Assignee: Kraft General Foods, Inc., Glenview, Ill.

[21] Appl. No.: 679,385

[22] Filed: Apr. 2, 1991

[51] Int. Cl.$^5$ .............................. A23L 1/24
[52] U.S. Cl. ........................... 426/605; 426/519; 426/602
[58] Field of Search .................. 426/519, 605, 602

[56] References Cited

U.S. PATENT DOCUMENTS 3,064,307 11/1962 Sanborn .
3,458,894 8/1969 Wheeler .
3,482,822 12/1969 Krizak et al. .
4,334,788 6/1982 Miner .
4,538,917 9/1985 Harms .
4,590,030 5/1986 Gillner et al. .

Primary Examiner—Joseph Golian
Assistant Examiner—Evan Federman
Attorney, Agent, or Firm—Thomas R. Savoie

[57] ABSTRACT

A mixing apparatus for viscous emulsions, and more particularly a mixing apparatus incorporating a pinned mixing chamber cooperating with splined rotor for the blending and homogenizing of at least one further constituent and/or air with a base emulsion received from a mixer in order to impart a specified and intended consistency and texture to a product produced from the emulsion. Furthermore, there is also provided a method for producing the product formulated from the viscous emulsion by utilizing the mixing apparatus; and a resultant viscous flowable product of improved and specified consistency and texture, such as a mayonnaise, mayonnaise-type emulsion or salad dressing formulated through the mixing apparatus and method.

6 Claims, 5 Drawing Sheets

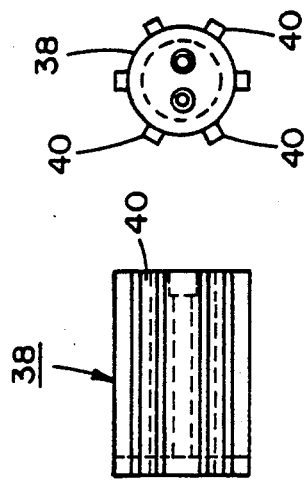
FIG.7
FIG.6
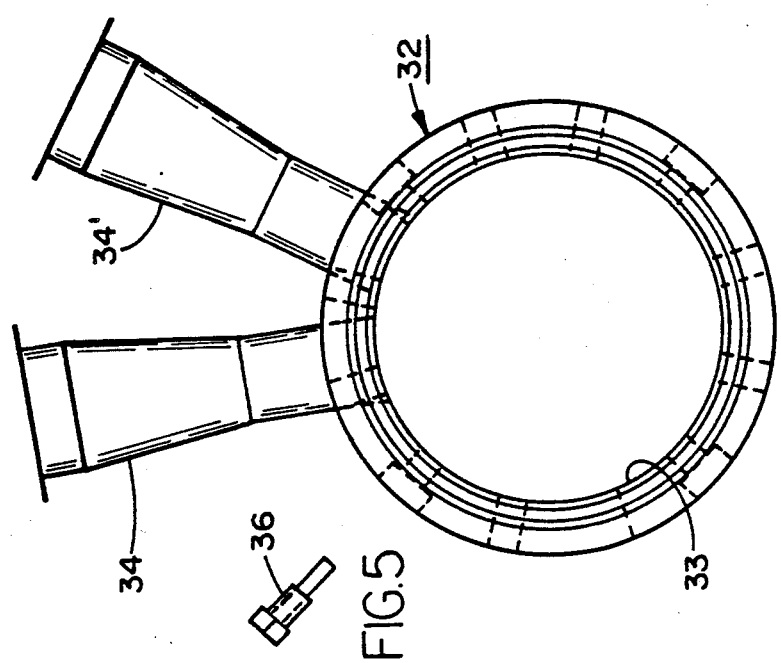
FIG.4
FIG.5
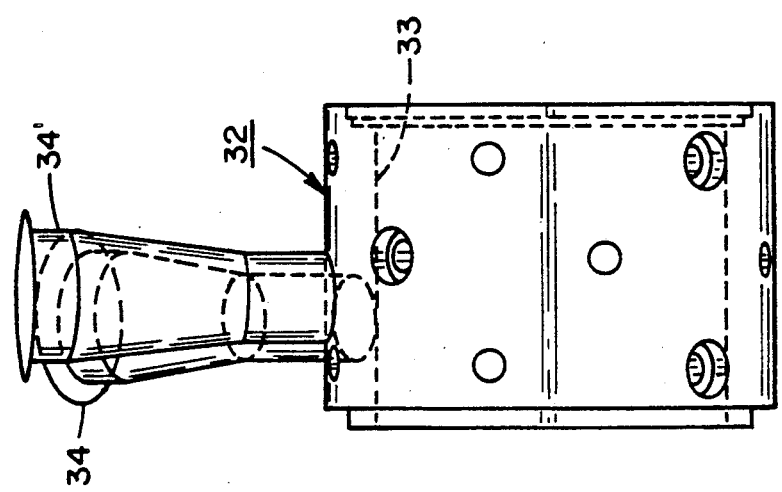
FIG.3

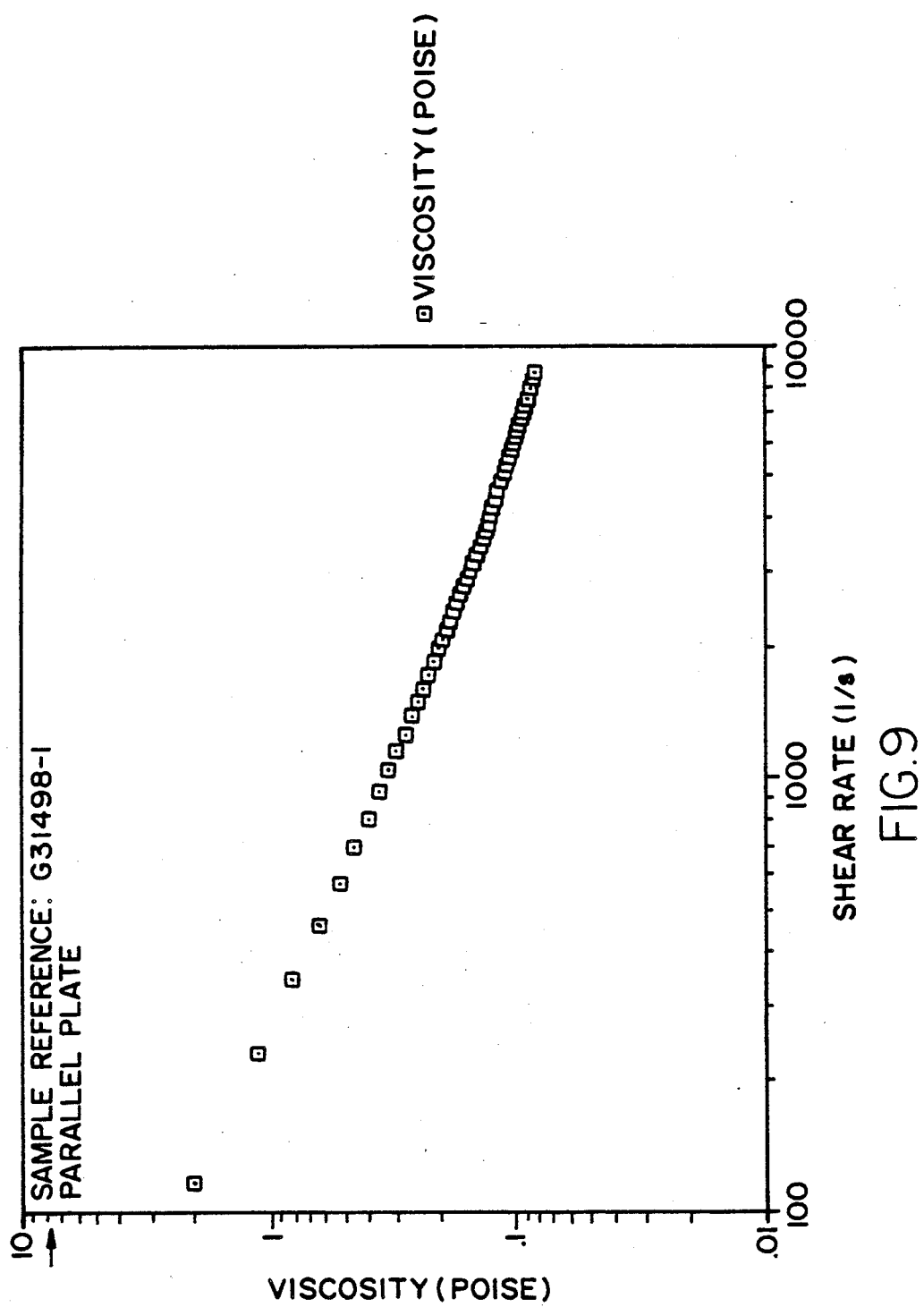

METHOD OF MIXING VISCOUS EMULSIONS

BACKGROUND OF THE INVENTION

1. Field of the Invention

The present invention relates to a mixing apparatus for viscous emulsions, and more particularly, relates to a mixing apparatus incorporating a novel mixing chamber for the blending and homogenizing of at least one composition and/or air with a base emulsion in order to impart a specified and intended consistency and texture to a product produced from the emulsion. Furthermore, the invention is also directed to the provision of a novel method for producing the product formulated from the viscous emulsion by utilizing the inventive mixing apparatus; and to a resultant viscous flowable product of improved and specified consistency and texture, such as mayonnaise, mayonnaise-type emulsion or salad dressing through the inventive mixing apparatus and method.

In the large-scale commercial production of emulsified sauces; for instance, such as mayonnaise, mayonnaise-like products, and various types of salad dressings, it is of extreme importance not only to provide a product which is organoleptically and aesthetically appealing to a consumer, but a product which enhances its sales appeal through the affording of a specific uniformity in its consistency in appearance and texture, which renders it more palatable to a consumer.

Hereby, pursuant to the invention it is desirable to be able to impart two different kinds of viscous emulsified sauces, such as various types of mayonnaise and possibly salad dressings, with a texture which renders the final product formulated by the viscous emulsion somewhat rough in its texture or "cheesy" in body, but which seems smooth or creamy in external appearance. Although this physical application would seem to be somewhat contradictory in terms when viewed superficially, that type of texture represents a product with an enhanced aesthetic appeal to a consumer since it apparently improves upon the spreadability of the product and renders it substantial or "full-bodied" in textural appearance. Hereby, the viscous emulsion or emulsified sauce which, in the instance of a usual mayonnaise, is formulated from approximately 80% fat, generally although not necessarily soybean oil, with the inclusion of whole eggs and egg yolks, water, spices and vinegar, is generally blended and homogenized in a commercial mixer; for instance by way of example only, such as a KMF-type Pentax mixer, sold by Bran & Luebbe, Inc., Wheeling, Ill., in which there is carried out a continuous, in-line mixing of the ingredients of the viscous emulsion so as to ultimately produce a flowable viscous product of specific viscosity or consistency and/or texture. Ordinarily, the mixer has a premixing chamber connected ahead of and communicating with the inlet of the mixer, whereby a rotary blade mounted on a central shaft mixes and blends the various ingredients of the emulsion with the chamber prior to the emulsion being conveyed into the mixer itself.

Similar mixing equipment and procedures are employed for other types of emulsified sauces, such as salad dressings, light mayonnaise, cholesterol-free and cholesterol-free light dressings which, under various circumstances, in order to meet consumer demands as to their caloric and/or cholesterol contents, will eliminate whole eggs and egg yolks and substitute egg whites or albumen, reduce the proportions of oil, and replace the latter with starch bases and/or gum to meet the requirements for the reductions in cholesterol and/or calories, while still maintaining the desired consistencies or viscosities and/or textures, or organoleptic properties for the formulated product so as to render the latter attractive to a consumer.

In order to meet the demands of the industry in being able to prepare commercially large quantities of various types of viscous emulsions at high rates of output, such as different kinds of mayonnaises, mayonnaise-type emulsions, and salad dressings, of normal types as well as low-caloric and/or cholesterol-free, while using essentially the same kind of mixer, in accordance with the invention, the standard type of premixing chamber currently utilized, which receives the constituents formulating the emulsion, and which under normal circumstances employees a rotor blade providing for blending and homogenizing the constituents of the emulsion prior to introduction into the mixer, has now been replaced by a novel and unique mixing chamber at the outlet or discharge end of the mixer, which incorporates structure providing a gentle shearing or folding action to the contents conveyed therethrough when various further constituents are added to the viscous base emulsions for formulating the final product. Hereby, the mixing chamber possess a cylindrical housing having a plurality of radially inwardly extending pin members projecting into proximity with a central rotor which may be of a longitudinally ridged, splined or paddle wheel design, and in which at least one further constituent is introduced, preferably radially, into the base emulsion in the mixing chamber, wherein this base emulsion is introduced axially at an upstream or inlet end of the chamber subsequent to having been passed through the mixer, and due to the interaction of the stationary pin members and rotor, this constituent is folded in a uniform and gentle manner into the viscous base emulsions so as to blend and homogenize to formulate a product exiting from the mixing chamber which will resultingly be imparted the desired organoleptic properties, viscosity or consistency and/or texture deemed aesthetically significant to a consumer.

Hereby, the constituent or constituents which may be added to the base emulsion in the mixing chamber and folded therein to blend and homogenize therewith by means of the novel pinned chamber structure cooperating with the ridged or splined rotor, may be either a starch base when producing a viscous salad dressing or reduced-calorie mayonnaise, and/or an injection of a flow of air for the production of the normally generally 80% fat mayonnaise, thereby imparting the desired rough or "cheesy" full-bodied texture to the finished product. For various formulations of the product, in lieu of air or starch base, or in addition thereto, it may also be desirable to impart to the base emulsion vinegar or a gum as a replacement for a portion of oil and whole eggs or yolks which have been removed from the emulsion in case the latter is intended to be a formulation for an essentially cholesterol-free and/or light (low-calorie) mayonnaise or the like.

Although numerous kinds of mixers are currently known and widely employed in the technology for the blending and homogenizing of various types of viscous emulsions and similar flowable products, none of these are adapted to provide for the unique folding action to produce a blending and homogenizing between a base emulsion and an added constituent and/or air, in order to cause the thusly admixed and blended product to uniformly assume a specified viscosity or consistency and/or texture upon the discharge thereof from a mixer, so as to meet the demands of a consumer for a relatively wide range of emulsified sauces or similar products, such as mayonnaises or salad dressings, utilizing the same equipment by simply varying the types and quantities of constituents added to the base emulsion in the inventive mixing chamber.

2. Discussion of the Prior Art

Gillner, et al. U.S. Pat. No. 4,590,030 discloses a process and apparatus for producing a uniform coating or layer of film or sheet for a mixture of components, in which a mixer includes a rotor, having specific reference to FIG. 7 of Gillner, et al., providing for radially outwardly projecting blades, and interspersed therewith, a plurality of radially inwardly projecting pin members to provide for a mixing action therewith. There is no disclosure of the unique folding action provided for by a splined rotor in cooperation with radially inwardly projecting stationary pins positioned at predetermined radial and axial spacings within a mixing chamber which will cause a folding of the constituents of a base emulsion received from a mixer and other constituents added thereto so as to impart a predetermined consistency and/or texture to a product formulated therefrom.

Harms U.S. Pat. No. 4,538,917 discloses a screw-type extruder having a plurality of pins extending into the interspaces between screw flights formed on a rotor so as to provide for a shearing action on an emulsion. There is no disclosure of the unique folding action on the constituents of a viscous emulsion afforded by the inventive pinned mixing chamber.

Miner U.S. Pat. No. 4,334,788 discloses a pin action mixing pump in which a plurality of rotary and stationary pins cooperate to impart a folding and blending action to a product. There is no disclosure of the unique admixing and folding being imparted to emulsified sources in a pinned mixing chamber analogous to that of the present invention.

Wheeler U.S. Pat. No. 3,458,894 discloses a mixer in which a rotor includes a flight of screwthreads, and with pin members radially extending therebetween so as to impart a shearing and mixing action to a flowable viscous product.

Krizak U.S. Pat. No. 3,482,822 discloses a mixing device in which a plurality of radially inwardly projecting stationary pin members extend intermediate outwardly pins located on a rotor so as to impart a folding and blending action to a flowable viscous product or emulsion conveyed therebetween. However, there is no disclosure of the unique folding action and blending between a base emulsion which has been treated in a mixer with one or more further constituents in a mixing chamber connected to the discharge of the mixer and receiving the treated base emulsion therefrom at a low rate of shear so as to produce a desired consistency and/or texture in a flowable viscous emulsified product, such as a mayonnaise or salad dressing.

Sanborn U.S. Pat. No. 3,064,307 discloses a continuous-feed proportional blender wherein a rotor includes splines adapted to impart a blending or mixing action to an emulsion conveyed therepast. However, there is no disclosure of splines on a rotor cooperating with stationarily arranged radially inwardly projecting pins mounted in the housing of a mixing chamber which will enable the gentle folding in of further constituents and/or air to a viscous base emulsion so as to impart a flowable viscous emulsion or product formulated thereby with specified consistencies or viscosities and/or textures.

SUMMARY OF THE INVENTION

Accordingly, it is a primary object of the present invention to provide a mixing apparatus of the type described herein which will facilitate the admixing and folding within a mixing chamber of one or more compositions, such as air, starch base, gum, vinegar or the like, into a viscous base emulsion received from a mixer, and to blend and homogenize the combined constituents uniformly and gently through mechanical action without imparting excessive shear thereto tending to separate the constituents, so as to impart desired consistencies, viscosities and/or textures to the blended viscous product.

A more specific object is to provide a mixing apparatus as described herein, in which the mixing chamber facilitating for the admixing and folding together of the further constituent and of the base emulsion which has been discharged into the mixing chamber from a mixer, includes a central splined or finned rotor cooperating with a plurality of stationary radially inwardly extending pins fastened to a mixing chamber housing encompassing the rotor so as to impart a gentle blending and homogenizing action to all of the constituents conveyed therepast, and to thereby cause the formulated viscous emulsified product to attain a predetermined or specified viscosity or consistency and/or texture.

Another object of the present invention to provide a method for the formulation of viscous emulsified sauces, such as mayonnaises, mayonnaise-like emulsions and salad dressings utilizing the inventive pinned mixing chamber which is connected with a mixer conveying a base emulsion to the mixing chamber so as to impart to the formulated viscous emulsified product a consistency and texture in conformance with consumer requirements.

Yet another object of the present invention is to provide a method as described herein, wherein the viscous emulsified product formulated from the admixed base emulsion and further constituent or constituents which are folded together and blended will provide for a specified consistency and/or texture over a wide range of different types of viscous emulsions.

A still further object of the present invention is to provide an emulsified sauce or viscous emulsion, such as mayonnaise, mayonnaise-like emulsion or salad dressing of the type described herein, possessing specified viscosities or consistencies and/or textures and which is produced by means of the mixing apparatus and method pursuant to the invention.

BRIEF DESCRIPTION OF THE DRAWINGS

The foregoing objects and advantages of the invention may now be more readily ascertained from the following detailed description of an exemplary embodiment thereof, taken in conjunction with the accompanying drawings; in which:

FIG. 3 illustrates a side view of the housing for the mixing chamber of FIG. 2;

FIG. 4 illustrates an end view of the housing of FIG. 3;

FIG. 5 illustrates a pin which is insertable into the mixing chamber and fastenable in the housing of FIG. 3;

FIG. 6 illustrates the rotor for the mixing chamber of the present invention, shown in a side view;

FIG. 7 illustrates an end view of the rotor; and

FIGS. 8 and 9, respectively, illustrate plots of viscosity versus shear for various emulsions blended by the mixing apparatus of the present invention.

DETAILED DESCRIPTION

Figure 1:
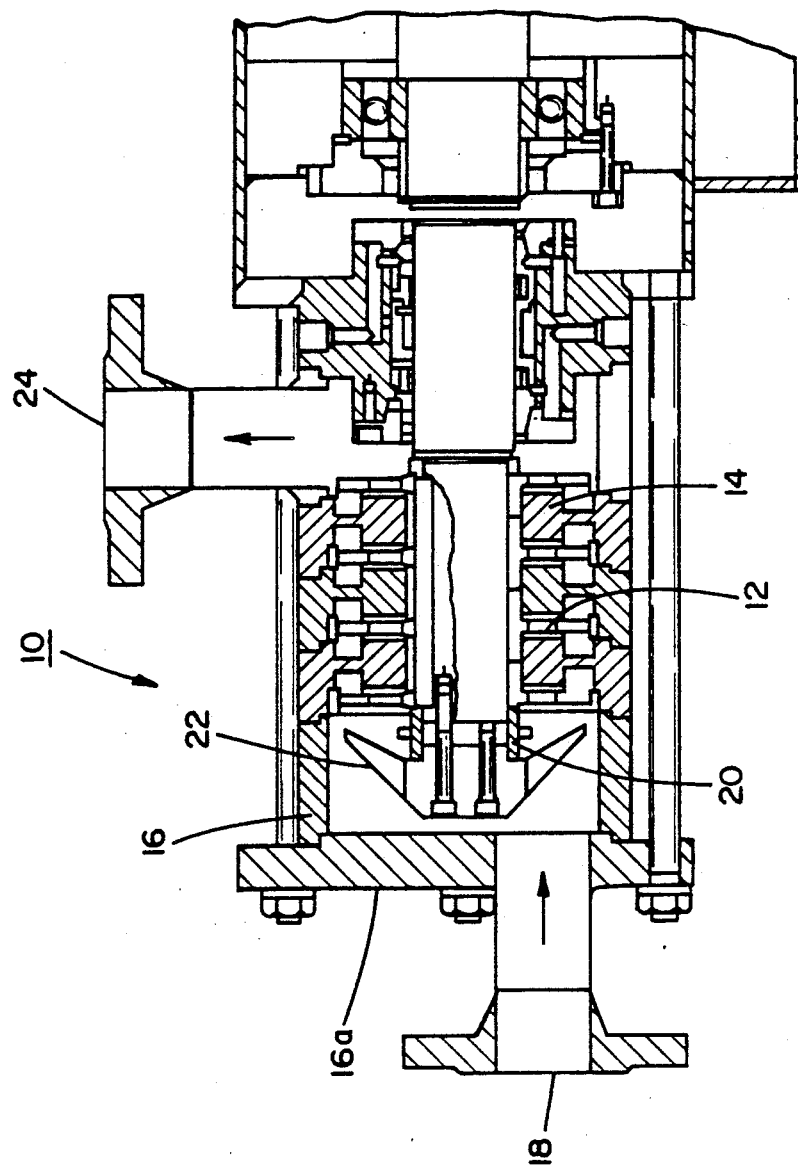
FIG. 1 illustrates a longitudinal sectional view of a typical mixer utilized for viscous emulsions, with a prior art type premixing chamber connected thereto.

Reverting more specifically to the drawings, and in particular FIG. 1, this illustrates a sectional view of a mixer 10 which is adapted to continuously mix and disperse, emulsify, homogenize or extract immiscible liquids which are to be transformed into stable emulsions; for example, such as mayonnaise, mayonnaise-type products, salad dressings, and varied kinds of emulsified fluids. Hereby, the mixer 10, as illustrated by way of example, may be a Pentax mixer of the KMF type, as is well known in the technology, incorporating a plurality of axially arranged rotor discs 12 and stator plates 14, in which the rotor dics may be equipped with milled teeth for low viscosity products and round studs for higher viscosities; although numerous other kinds and makes of mixers readily lend themselves to this technology.

As shown in FIG. 1, the mixer 10 which includes the plurality of axially arranged rotor discs 12 and stator plates 14, also includes a premixing chamber 16 mounted at the infeed end of the mixer 10, and which communicates with an axial inlet port 18 in an end plate 16a for the continual infeed of a typical viscous emulsion which, in the instance of regular mayonnaise, is normally approximately 78 to 80% oil, preferably soybean oil, approximately 10% of whole eggs and egg yolk, approximately 6.5% of water and spices, and approximately 4.5% of 70-grain vinegar.

Premixing of the constituents of the viscous emulsion is ordinarily effected within the premixing chamber 10 through the intermediary of a rotor 20 having rotor blades 22 mounted thereon. A suitable drive unit (not shown) for the mixer concurrently imparts rotation to the rotor 20 so as to impart a suitable advancing and mixing speed to the emulsion. At the discharge end of the mixer 10, a radially oriented discharge outlet 24 is adapted to receive the fully blended and homogenized emulsified product from the mixer for further processing.

Although the foregoing meets the requirements in providing adequate mixing action for the blending and homogenizing of a viscous emulsion, there is no capability present for adapting the mixer to the blending and homogenizing of varied species of viscous emulsions possessing widely differing viscosities and constituents without the need of having to modify extensively the mixing apparatus.

Figure 2:
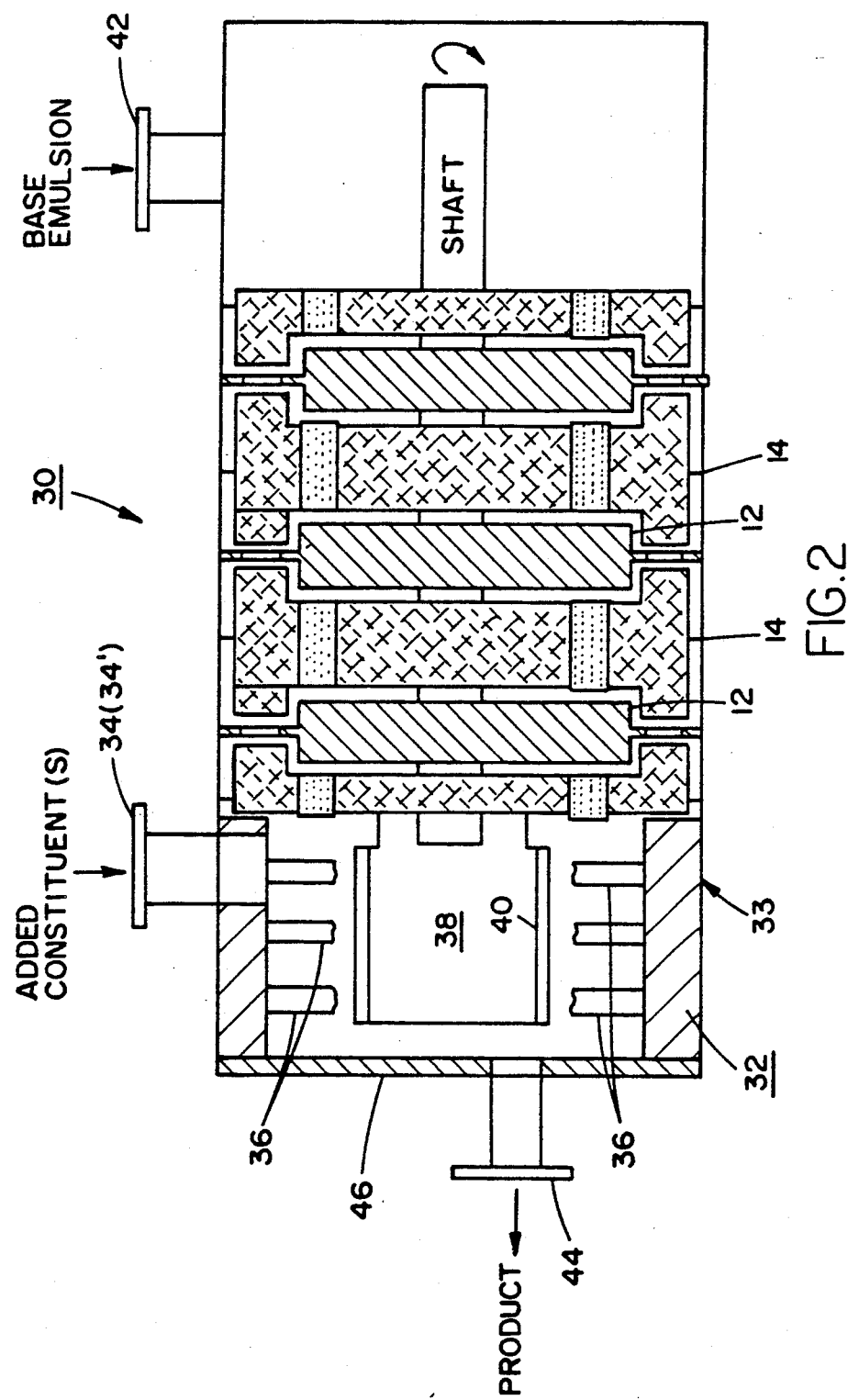
FIG. 2 illustrates, on an enlarged scale and in a generally schematic cross-sectional representation, a segment of the mixer of FIG. 1, incorporating the novel mixing chamber connected to the outlet or discharge of the mixer so as to provide a mixing apparatus pursuant to the present invention.

In order to be able to accomplish this purpose, the present invention, as shown more specifically in FIG. 2 of the drawings, illustrates, diagrammatically, a mixer 30 equipped with the structure of a modified mixing chamber 32 pursuant to the inventive concept which is essentially a post-mixing chamber instead of the currently employed premixing chamber 16. Hereby, the inventive mixing chamber 32, as shown in more specific detail in FIGS. 3 through 7 of the drawings, includes a cylindrical housing 33, which is axially longer than the prior art premixing chamber 16, and is attachable as to an outlet or discharge end of the mixer 30 which heretofore, as shown in FIG. 1, was normally the inlet end of the mixer; i.e., the mixer now is employed with a reverse direction of flow therethrough. The housing 33 is provided with one or more radial inlet connectors 34, 34' communicating with the interior of the mixing chamber 32.

As is ascertainable from FIGS. 2 through 4, a plurality of pin members 36, circumferentially and axially spaced in a number of rows are mounted on the housing 33 of the mixing chamber 32 so as to extend radially inwardly into close proximity with a rotor 38. The rotor has a plurality of circumferentially spaced axially-extending splines or ridges 40 formed thereon, in essence, to form a paddle wheel-like structure, as shown more specifically in FIGS. 6 and 7 of the drawings. This rotor 38 replaces the shorter length rotor 20 and rotor blade 22 construction of the prior art premixing chamber 16, and allows for a continuous low shear, relatively gentle folding and mixing action between the constituents of the base emulsion and any other constituents being fed into the mixing chamber 30 at rotor speeds of up to 3600 RPM.

Pursuant to the invention, in order to impart a somewhat rough or "cheesy" textural appearance to the mayonnaise, an appearance which is considered to be highly desirable from the standpoint of a consumer since it adds "body" or a substantive feel and look to the mayonnaise product, the basic ingredients of the viscous emulsion are fed into the mixer 30 through an inlet 42 and blended and/or homogenized therein while being conducted towards the mixing chamber 32. The basic viscous emulsion is then discharged into the mixing chamber 32 from the mixer 30, preferably in an axial direction intermediate the rotor 38 and the radially inwardly extending pin members 36. Concurrently, a flow of pressurized air may be conducted through either the inlet 34 or 34' into the mixing chamber 30 so as to be pumped into the base emulsion received from the mixer 30 and which is constituted of the basic ingredients of the mayonnaise, and during the blending and folding effect imparted thereto through the interaction of the pin members 36 and splines 40 on the rotor 38, is homogeneously dispersed within the mayonnaise or viscous emulsion so as to formulate a product having a specified consistency or viscosity and/or texture of high appeal to a customer. The product is then discharged in a continuous manner from the mixing chamber 32 through a discharge orifice, or connector 44 provided in an end plate 46 of the cylindrical housing 33 for further processing, such as packaging or the like.

When it is desired to have the constituents of the base emulsion admixed with other ingredients or substitute some proportions of its constituents, for example, for the production of light mayonnaise which eliminates the egg yolk and some of the oil, some of the oil may be replaced with a starch base conducted into the mixing chamber 32 through one of the inlets 34 or 34' as an alternative to or in addition to the air being supplied. The added starch base, which may reduce the amount of oil content from about 80% to about 35%, then imparts a higher consistency or viscosity to the emulsion, while the air may also impart the desired "cheesy" or roughened texture considered to be desireable by a consumer for this product.

Upon occasion, when formulating a cholesterol-free light mayonnaise, the portions of the oil and whole eggs and egg yolks which have been eliminated from the constituents may be replaced by additions of gum and starch base which are introduced into the mixing chamber 32 through, respectively, inlets 34 and 34' so as to impart the desired consistency and texture to the product formulated in the mixing chamber 12. This enables the starch base to reduce the content of oil in the mayonnaise or base emulsion from about 80% to 35%, and to provide a product having a viscosity of about 200 poises or even higher.

It is also possible to include vinegar as an added constituent, such as up to 4%, particularly when manufacturing salad dressings employing the inventive mixing chamber 32; and when producing a viscous or essentially "creamy" salad dressing or a reduced-calorie mayonnaise, to concurrently introduce starch base into the mixing chamber 32 through the second radial inlet 34', and allowing the interaction between the pin members and the splined rotor to fold and gently blend and homogenize at a low shear so as to formulate a homogeneous emulsified product possessing the desired viscosities and textures.

The structure is adapted to be employed with various types of emulsions, and of particular interest are different kinds of mayonaises including light (low-calorie) mayonnaise, cholesterol-free light mayonnaise, and also various types of salad dressings, wherein there is provided a blending of the starch base and incorporation of air producing minute pockets within the emulsion, which, although imparting a smooth appearance, still provides a roughened or "cheesy" texture or consistency to the final product, considered to be aesthetically and organoleptically pleasing to a consumer.

In various instances, for example, when normal 80%-fat mayonnaise is processed, the only addition to the base emulsion being conveyed into the mixing chamber 32 from the mixer 30 is the addition of air through the radial inlet 34, so as to affect the texture of the final emulsified product.

Figure 8:
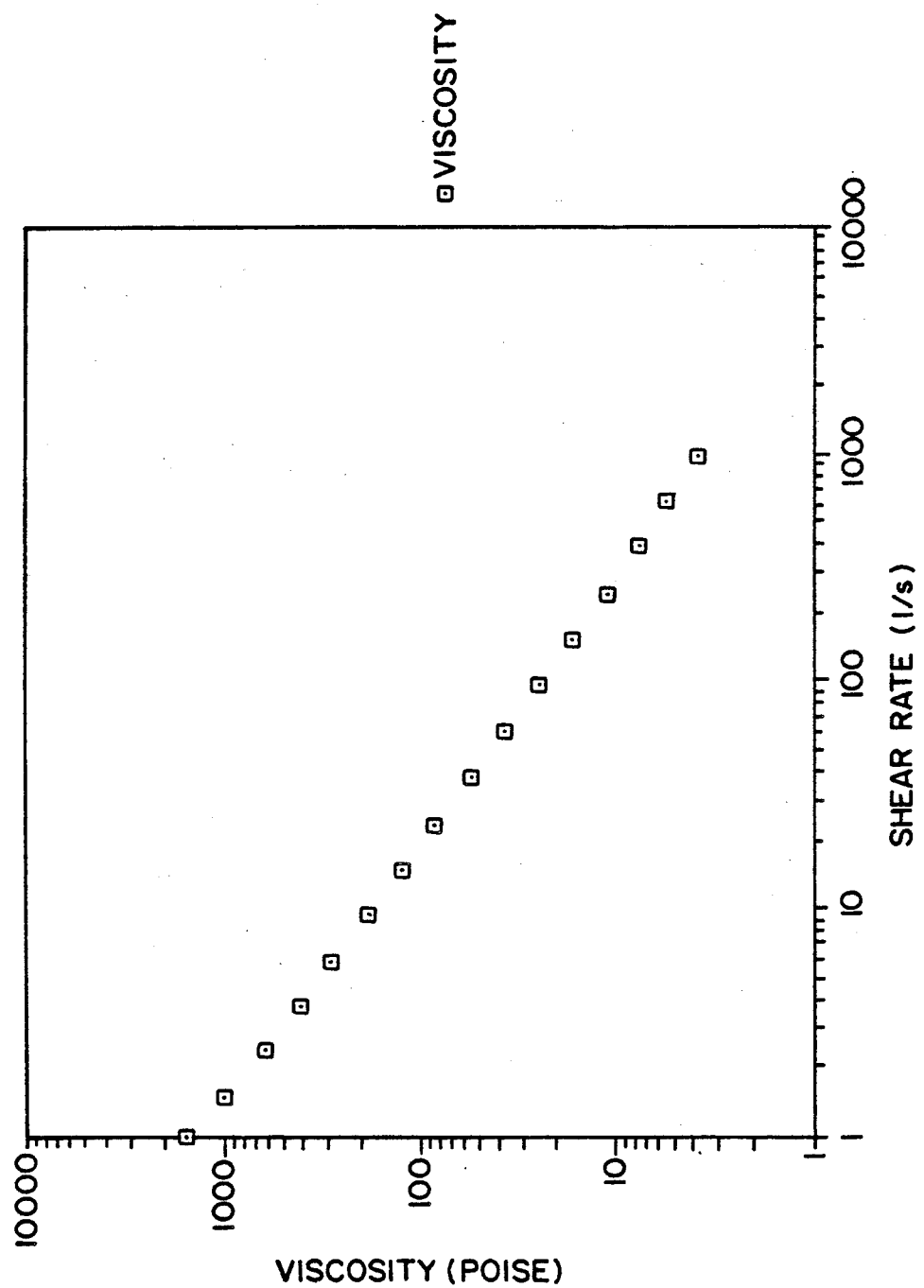

The emulsified product which is processed in the mixing apparatus pursuant to the invention, as shown in FIGS. 8 and 9, may possess a wide range of viscosities, possibly from less than 10 to higher than 1000 poises, depending upon the constituents and type of base emulsion being homogenized and the added constituents, such as air, base starch or gum blended therein, and a basic object is to be able to impart a specified texture and consistency or viscosity to the homogenized final emulsified product.

A further advantage of the invention resides in that the pinned mixing chamber 32 is designed with a rotor 38 of adequate length so as to, in conjunction with the plurality of axially and circumferentially spaced rows of pin members projecting radially inwardly into proximity to the rotor, cause the constituents in the mixer to rotate for lengthier periods of time and therefore permit the folding, blending and homogenizing of the starch bases and air with the base emulsion in a highly efficient manner. Consequently, irrespective as to the different types of viscous emulsions being blended and folded with the added constituent or constituents in the mixing chamber, there is achieved a product of a consistency and texture with a highly uniform degree of quality.

While there has been shown and described what is considered to be a preferred embodiment of the invention, it will, of course, be understood that various modifications and changes in form or detail could readily be made without departing from the spirit of the invention. It is therefore intended that the invention not be limited to the exact form and detail herein shown and described, nor to anything less than the whole of the invention herein disclosed as hereinafter claimed.

What is claimed is:

1. A process for the formulation of viscous products possessing specified consistencies and textures; comprising blending a viscous base emulsion in a mixer; continually discharging said blended base emulsion from said mixer into a mixing chamber, said mixing chamber having a housing forming an annular space about a central splined rotor projecting into said mixing chamber, and a plurality of radially inwardly projecting stationary pin members extending from the inner wall of said chamber into proximity with the circumference of said rotor, said continuous feed of viscous base emulsion into said mixing chamber from said mixer being substantially axial into said annular space intermediate said housing wall and said rotor; and continually introducing into said mixing chamber in a radial orientation at least one further constituent to said base emulsion whereby the base emulsion advancing through said mixing chamber and the further constituent admixed therewith are folded together through the interaction between said pin members and rotor blending and homogenizing said emulsion and further constituent to formulate a product having said specified consistency and texture.

2. A process as claimed in claim 1, wherein said pin members are axially and circumferentially spaced within said mixing chamber so as to cause the folding action between said emulsion and said constituent in conjunction with the rotation of said splined rotor.

3. A process as claimed in claim 2, wherein said splined rotor includes a plurality of circumferentially-spaced axially extending splines cooperating with said pin members to fold together said viscous emulsion and further constituent within said mixing chamber.

4. A process as claimed in claim 2, wherein said base emulsion comprises mayonnaise, and said further constituent comprises pressurized air forced into said emulsion and blended therein responsive to the interaction between said pin members and said rotor.

5. A process as claimed in claim 2, wherein said base emulsion comprises a mayonnaise-like material, and said further constituent comprises a starch base.

6. A process as claimed in claim 6, wherein pressurized air is introduced into said base emulsion in addition to said starch base.

* * * * *